United States Patent [19]

Doguet et al.

[11] Patent Number: 5,783,718
[45] Date of Patent: Jul. 21, 1998

[54] PROCESS FOR THE PREPARATION OF POLYORGANOSILOXANES BY HYDROLYSIS OF ORGANOHALOSILANES

[75] Inventors: Loic Doguet, Peage de Roussillon; Patricia Fompeyrine, Ste-Foy-les-Lyon, both of France; Etienne Foucher, New York, N.Y.; Frederic Leising, Avilly St-Leonard, France

[73] Assignee: Rhone-Poulenc Chimie, Courbevoie, France

[21] Appl. No.: 872,678

[22] Filed: Jun. 11, 1997

[51] Int. Cl.⁶ ............................................. C07P 7/08
[52] U.S. Cl. ........................ 556/453; 556/450; 556/456
[58] Field of Search ........................... 556/453, 450, 556/456

[56] References Cited

U.S. PATENT DOCUMENTS 5,126,470  6/1992  Schulz et al. ...................... 556/453
5,300,669  4/1994  Akamatsu et al. .................. 556/453

*Primary Examiner*—Paul F. Shaver
*Attorney, Agent, or Firm*—Andrew M. Solomon

[57] ABSTRACT

The invention relates to a process for the preparation of polyorganosiloxanes by hydrolysis of organohalosilanes of formula (I) $R_aR^1_bSiX_c$, wherein R and $R^1$ identical or different, are an hydrogen atom or a linear or branched $C_1$–$C_6$ alkyl, aryl, alkylaryl or aralkyl group; X is a halogen atom; and a+b+c=4 and 0<c<4; said process comprising the steps of carrying out three or more successive hydrolysis steps (1), (2), (3), in which the reaction medium is capable of exerting an increasing hydrolysing force on the organohalosilanes (I), wherein step (1) is a hydrolysis under pressure in the presence of an aqueous solution $S_1$ of saturated hydrogen halide, at the pressure and temperature of the reaction medium; and, optionally, carrying out one or more coalescence step (4).

22 Claims, 1 Drawing Sheet

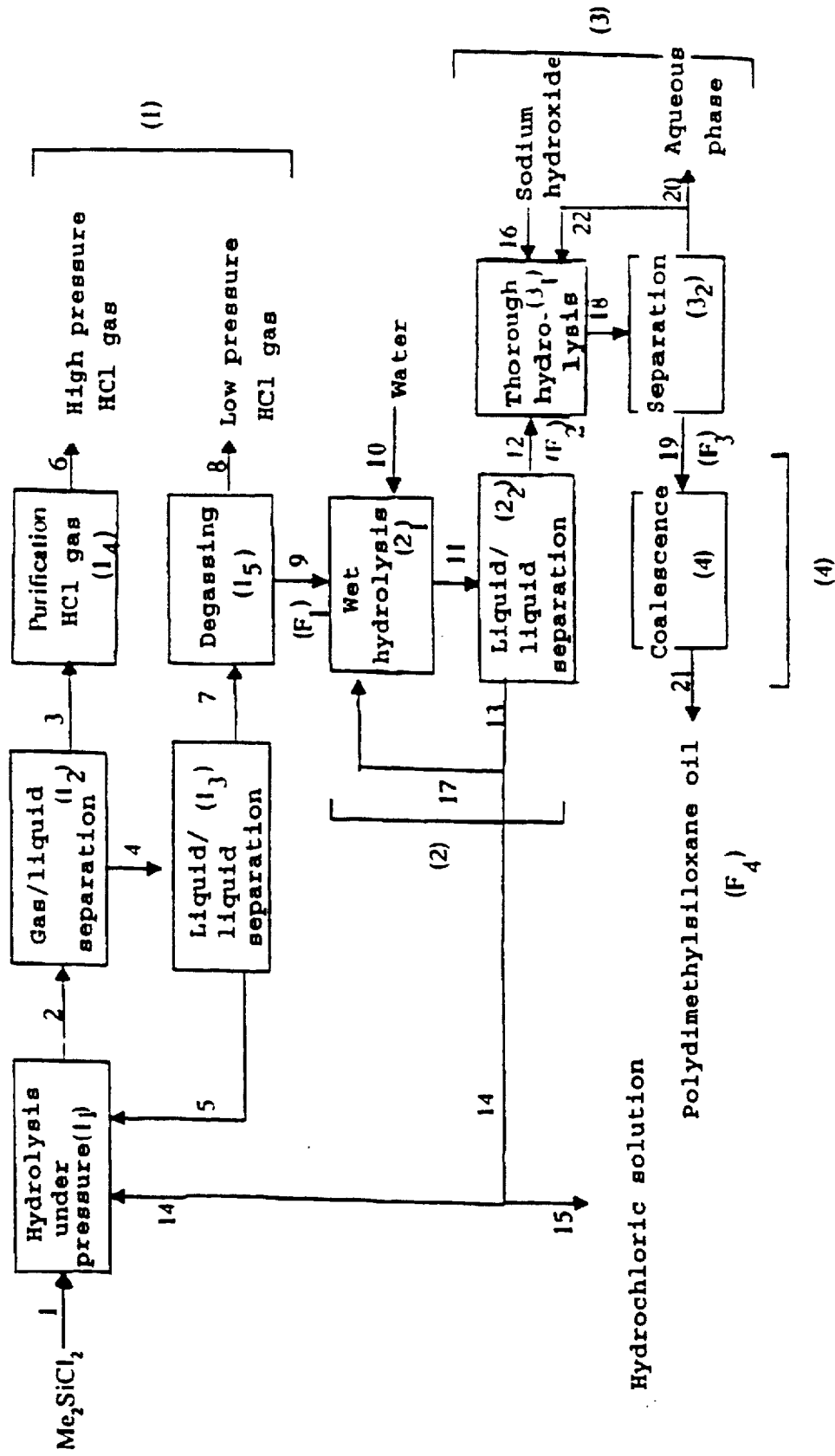
(FIG. 1)

PROCESS FOR THE PREPARATION OF POLYORGANOSILOXANES BY HYDROLYSIS OF ORGANOHALOSILANES

The present invention relates to a fundamental principle of silicone chemistry, namely the hydrolysis of halosilanes and more particularly of organohalosilanes to obtain poly(organo)siloxanes. This synthesis is based on the very high reactivity with water of ≡Si—Cl bonds and, to a lesser extent, of ≡SiOR bonds (R=alkyl).

Organohalosilanes are thus converted by hydrolysis and polycondensation (homo- and heterocondensation) into intermediate polyorganosiloxanes (oligoorganosiloxanes) of linear or cyclic structure, which may themselves be polymerized and crosslinked into silicone oils or into silicone elastomers of higher molecular weight.

Dimethyldichlorosilane is an organohalosilane which is well known as a starting material for this hydrolysis/condensation reaction.

Technical processes involving the said hydrolysis/condensation reaction of $Me_2SiCl_2$ operate continuously and are fully established industrially. This is described, for example, by H. K. Lichtenwalner and M. M. Sprung in Encyclopedia of Polymer science Vol. 12 Wiley and Sons, New York, 1970.

The hydrolysis of $Me_2SiCl_2$ leads to a complex mixture of cyclic and linear oligoorganosiloxanes. Conventionally, the source of reaction water required for the hydrolysis is formed by a hydrochloric acid solution. To make this process as viable as possible, the hydrochloric acid formed by hydrolysis is recovered and may thus be upgraded, for example, by being reacted with methanol to form chloromethane, which is a starting material in the synthesis of dimethyldichlorosilane, according to the direct synthesis process.

Various proposals for the hydrolysis of organohalosiloxanes, e.g. $Me_2SiCl_2$, find their place in the prior art.

Thus, a process is known, from French patent application No. 2,512,028, for the hydrolysis of organohalosilanes, in particular of $Me_2SiCl_2$, in which the source of water for hydrolysis of the organohalosilane is an aqueous hydrochloric acid solution having at least 35% by weight of hydrogen chloride, the said solution being used in an amount such that the $H_2O$/organochlorosilane molar ratio ranges between 10 and 30. The hydrolysis takes place in a single step. The aims targeted here are, on the one hand, to reduce significantly the weight percentage of halogen (chloride) in the polyorganosiloxane-based hydrolysate obtained, and, on the other hand, to obtain better cyclopolyorganosiloxane yields. For reaction temperatures of between 20° and 30° C., the concentration of the aqueous HCl solution is less than or equal to 37% by weight. In any case, irrespective of the temperature, this HCl solution is never saturated in the examples of that patent application No. 2,512,028.

The drawback of such a hydrolysis in the presence of an excess of water leads to large amounts of aqueous hydrochloric acid. Now, given that the most easily upgradeable HCl is HCl gas, it is necessary to carry out a distillation of the aqueous HCl, which is particularly expensive.

In addition, hydrolysis in the presence of an excess of water is extremely exothermic, inevitably entailing operating difficulties.

The invention covered by French patent application No. 2,518,099 has the aim of overcoming these drawbacks, by using a virtually stoichiometric amount of water, for a one-step hydrolysis of dimethyldichlorosilane. This makes it possible to obtain anhydrous hydrochloric acid (gas), a saturated aqueous hydrochloric acid solution and a polyorganosiloxane hydrolysate. Although the aqueous HCl at the end of the hydrolysis is saturated, it emerges from the examples that this is in no way the case for the initial HCl solution. Cf. Example 3: 37% by weight at 60° C. It may therefore be concluded that the HCl produced in the reaction is not entirely released in gaseous form.

The invention according to FR-A-2,518,099 is aimed at avoiding the excesses of water without, however, creating conditions of a water deficit, which are known to give rise to linear polyorganosiloxanes that are not fully hydrolysed and comprise halogens (chlorines) in terminal positions. This is entirely penalizing since the hydrolysis must then be completed using large amounts of water, thereby leading to aqueous HCl effluents that are particularly burdensome and awkward to deal with insofar as it is difficult to recycle them and/or to reprocess them at a lower cost.

It is not possible to carry out this additional hydrolysis with small amounts of water since, under such conditions, a polycondensation of the oligoorganosiloxanes takes place, the direct consequence of which is to increase the viscosity prohibitively.

More recently, U.S. Pat. No. 5,169,970 discloses a process for the hydrolysis of organochlorosilanes, according to which the hydrolysis is carried out in two stages:

the first hydrolysis step consists in hydrolysing the organochlorosilane by using a substantially stoichiometric amount of water and thus producing a hydrolysate made of polyorganosiloxanes, in the second hydrolysis step, the hydrolysate obtained from step 1 is subjected to this same treatment, but this time using an amount of water in stoichiometric excess, the source of water consisting of an HCl solution having a predetermined HCl concentration.

This process is supposed to make it possible to obtain a polyorganosiloxane hydrolysate without suffering the drawbacks of the known techniques involving a hydrolysis step, and which include either an excess of water or a deficit of water, or a stoichiometric amount of water, relative to the organohalosilane. This process would also make it possible to regulate the viscosity of the polyorganosiloxane obtained.

This process is flawed in that it produces HCl gas at low pressure, which complicates the recovery and upgrading of this gas.

The principle of a two-step hydrolysis is also adopted in the process for the manufacture of polydimethylsiloxane described in European patent application No. 0,658,588. According to this process, dimethyldichlorosilane is reacted in a first step with water, supplied by an aqueous hydrochloric acid solution with a titre of 25% by weight, in order to obtain a crude hydrolysate consisting of cyclic and linear α,ω-dichloro polydimethylsiloxanes and hydrogen chloride gas.

In a second step, the crude hydrolysate is treated with steam to reduce its chlorine content by additional hydrolysis, which also results in the formation of aqueous hydrochloric acid. The latter is recycled into the first step of the process.

The pressure of hydrogen chloride gas in the first step is between 0.15 and 0.5 MPa, in particular between 0.25 and 0.35 MPa. The temperature of step 1 is room temperature, whereas for step 2, reference is made to a temperature of between 110° and 160° C. At the end of the first hydrolysis step, the polydimethylsiloxane obtained comprises 50% cyclic oligomers and 50% linear α,ω-chloro oligomers.

The use of such an HCl titre in the hydrolysis step in step 1 and of a high temperature in step 2 makes it difficult to stabilize and to control the viscosity of the final products.

Patent application DD-227,145 describes a process for the preparation of neutral dimethyldichlorosilane hydrolysate having a low viscosity and stability on storage, as well as a residual content of SiCl bonds of less than 10 ppm. This process comprises a treatment for the removal of the remaining SiCl groups and aqueous HCl contained in a dimethyldichlorosilane hydrolysate by passing this hydrolysate, after washing and/or neutralization, through a porous material in sheet form. This material is a fibrous material of the paper or textile type (wool, cellulose, polyester, glass fibre). Such a filtration is carried out at room temperature and makes it possible to obtain a hydrolysate having a residual SiCl content of 2 ppm and an undetectable HCl concentration.

This process for the treatment of dichlorodimethylsilane hydrolysate does, admittedly, make it possible to reduce the impurities in the final product, but the efficacy of such a process can really only be guaranteed if the prior steps lead to a product which is fit to be treated by coalescence on a porous support.

However, this cannot be said for the hydrolysate according to DD-227,145.

It emerges from this review of the prior art that there is a deficiency in terms of a process for the preparation of polyorganosiloxanes by hydrolysis of organohalosilanes which makes it possible to obtain a hydrolysis product of the hydrogen halide type in gaseous form and under pressure, which makes it possible to remove the ≡SiX bonds as fully as possible;

which leads to a final polyorganosiloxane hydrolysate that is free or virtually free of acidic aqueous droplets;

which makes it possible to avoid the formation of excessive amounts of acidic aqueous effluents, with its inherent problem of reprocessing, which makes it possible to control the viscosity of the polyorganosiloxane, and lastly, which makes it possible to manufacture a polyorganosiloxane of high quality and in particular of high purity, so as to afford it optimum stability.

One of the essential aims of the present invention is to overcome this deficiency, by providing a process which satisfies the specifications targeted above.

Another essential aim of the present invention is to provide a process for the preparation of polyorganosiloxane in which the hydrolysis takes place in the presence of a deficit of water, relative to the stoichiometric amounts, in the initial hydrolysis phase, and which moreover does not require the subsequent use of large amounts of water in order to remove the terminal Si-halogen residues that are still present in too high a concentration after the first hydrolysis. This avoids the production of halogen-containing aqueous effluents that are difficult to recycle and/or to reprocess, on account of the siloxane impurities that they always contain.

Another essential aim of the present invention is to provide a process for the preparation of polyorganosiloxanes by hydrolysis of organohalosilanes, which offers the possibility of ensuring constant control of the viscosity of the reaction medium.

Another aim of the present invention is to provide a process for the hydrolysis of organohalosilane leading to polyorganosiloxanes, which are free or virtually free of residual halogens, as well as of aqueous droplets containing a solute formed by the hydrogen halide obtained from the hydrolysis.

Another essential aim of the present invention is to provide a process for the preparation of polyorganosiloxanes by hydrolysis of organohalosilanes, which is easy to carry out and economical (high levels of productivity and of yield).

Another essential aim of the present invention is to provide a process for the hydrolysis of organohalosilanes leading to polyorganosiloxanes, this process needing to be able to be carried out according to a continuous or batchwise mode, by satisfying the specifications targeted above in one or other of the cases.

These aims, among others, are achieved by the present invention which relates to a process for the preparation of polyorganosiloxanes by hydrolysis of organohalosilanes of formula (I) $R_aR^1_bSiX_c$, in which:

R and $R^1$ are identical or different radicals representing hydrogen or linear or branched $C_1$–$C_6$ alkyls, aryls, alkylaryls or aralkyls, X represents a halogen, and a+b+c=4 and 0<c<4; characterized in that it consists essentially in using:

at least three successive hydrolysis steps (1), (2), (3), in which the reaction medium is capable of exerting an increasing hydrolysing force on the organohalosilanes (I), and, optionally, at least one coalescence step (4), and in that step (1) is a hydrolysis under pressure in the presence of an aqueous solution $S_1$ of saturated hydrogen halide, at the pressure and temperature of the reaction medium.

The Applicant has thus, to its credit, demonstrated, entirely surprisingly and unexpectedly that:

the combination, on the one hand, of at least three successive hydrolysis steps with an increasing hydrolysing force and, on the other hand, of a first hydrolysis step under pressure, with a saturated aqueous phase of hydrogen halide corresponding to the hydrolysis products of the ≡SiX halosilane bonds, makes it possible to obtain pure polyorganosiloxanes free of residual SiX and of traces of aqueous phase.

Such a result is all the more advantageous since it may be achieved relatively easily and economically, with good productivity and good yields, according to a continuous or batchwise mode.

In addition, the process according to the invention is not of a nature to generate large amounts of effluents contaminated with halides. This greatly simplifies the process with regard to its environmental impact.

It should also be mentioned that the problem of controlling the viscosity of the reaction medium, which, moreover, follows directly from controlling the hydrogen halide titre, is solved by means of the methodology according to the invention, which is based on the use of an increasing hydrolysing force and on the saturation of the starting aqueous phase with hydrogen halide.

Without wishing to be bound by the theory, it may be considered that the process according to the invention allows optimization of the hydrolysis by minimizing the phenomena of blocking of the hydrolysis water, associated with the hydration of the hydrogen halide.

For the purposes of the present invention, the expression increasing hydrolysing force is understood to refer to a nucleophilicity gradient of the reaction medium, this gradient extending over the three hydrolysis steps (1), (2) and (3). More precisely, this means that the reactivity of the aqueous phase towards the ≡SiX bonds increases with the passage of steps 1,2 and 3.

For the purposes of the invention, as regards the notion of saturation with hydrogen halide of the aqueous phase of the reaction medium of step (1), it should be understood that the concentration of hydrogen halide solute in the water is at a maximum. That is to say that the reaction medium is in a gaseous atmosphere formed by the hydrogen halide gas.

It is clear that this point of saturation naturally depends on the nature of the solute as well as on the temperature and pressure conditions of the medium. A person skilled in the art is entirely capable of dealing with this question of the saturation of the solution $S_1$ from step (1).

In accordance with a preferred embodiment of the process according to the invention, a continuous operating mode is adopted.

Moreover, without this being limiting, the halogen X is preferably chlorine, such that the halide produced in this case is HCl. For simplicity, halogen X or chlorine (Cl) and hydrogen halide (HX) and hydrogen chloride (HCl) will be used without discrimination in the remainder of this description.

Preferably, step (1) of hydrolysis under pressure consists of:

at least one hydrolysis ($1_1$) of organohalosilanes (I) leading to an at least threephase crude hydrolysate comprising:

a gas phase formed of hydrogen halide gas under pressure, a siloxane fluid $F_1$ consisting essentially of linear α,ω-dihalo oligomers and, optionally, to a lesser extent, of cyclic oligomers, and an aqueous phase containing the solution $S_1$ saturated with hydrogen halide;

at least one gas/liquid separation ($1_2$) intended to collect the hydrogen halide gas under pressure, on the one hand, and an $F_1/S_1$ mixture, on the other hand;

at least one liquid/liquid separation ($1_3$) allowing recovery of $F_1$ and $S_1$, the latter advantageously being recycled into ($1_1$);

optionally at least one purification ($1_4$) of the gas collected in ($1_2$), preferably by condensation;

and optionally at least one additional degassing ($1_5$) of the fluid $F_1$ collected in ($1_3$), preferably by decompression.

· Advantageously, this reaction ($1_1$) takes place continuously with vigorous stirring in a closed chamber, for example at a temperature of between 10° and 50° C. and at a pressure determined by the hydrogen halide gas produced by hydrolysis. In practice, the hydrogen halide gas pressure is adjusted to a value greater than or equal to 0.10 MPa and preferably between 0.15 and 1 MPa.

The input flow rates of the reactants into the reactor of step ($1_1$) is adjusted such that the mass ratio of phase to supply $MR_1$=aqueous phase/organohalosilane (I) is ≧2 and preferably between 3 and 15.

This MR is one of the important characteristics of the process according to the invention since it determines, together with the hydrogen halide concentration of the aqueous phase and the stirring regime (inter alia), the water concentration at the aqueous phase/organohalosilane (I) interface, and the hydrolysing force of the medium is, obviously, dependent on this interfacial water concentration.

The crude hydrolysate obtained at the end of step ($1_1$) is advantageously a three-phase mixture.

In practice, $F_1$ consists of a mixture of linear α,ω-dihalo oligoorganosiloxanes and of cyclic oligoorganicsiloxanes in which:

the first represent at least 50 mol %, preferably at least 60 mol %, of the mixture, and the second represent not more than 50 mol %, preferably not more than 40 mol %, of the mixture.

This siloxane fluid $F_1$, which is also referred to as "chlorosilox", contains, for example, about 8 to 13% by weight of residual halogen of HX and ≡SiX types.

Advantageously, the duration of the reaction of step ($1_1$) is between 30 s and 5 min, preferably between 1 and 2 min.

The hydrogen halide gas obtained under pressure at the end of step ($1_2$) of gas/liquid separation may be upgraded for practical purposes, for example as regards HCl, in the industrial preparation (at high throughput) of methyl chloride, by reaction with methanol. Methyl chloride is a starting material in the chemistry of organosilanes.

Optionally, the gas may be purified under pressure obtained in ($1_2$), by means of a treatment ($1_4$), which may be, for example, a condensation at a temperature of between 0° C. and −10° C., thereby making it possible to eliminate the light volatile polysiloxanes.

As specified above, it is advantageous to recycle the hydrochloric solution $S_1$ recovered after the liquid/liquid separation ($1_3$). Such a recycling in step ($1_1$) has an influence on the quality of the final siloxane fluid or oil. According to a preferred arrangement of the invention, the recycling constitutes the sole or predominant route of supplying with hydrochloric solution $S_1$ in the reaction of step ($1_1$). Consequently, the mass ratio for the recycling of $S_1$ on (I) will be, in this hypothesis, equivalent to the $MR_1$ defined above, that is to say greater than or equal to 2 and preferably between 3 and 15 or very close to $MR_1$.

The optional degassing ($1_5$) of $F_1$ is carried out, for example, by means of a flash decompression with a ΔP of about 0.2 MPa, for example. Hydrochloric acid gas is thus recovered, which may be upgraded directly towards an industrial synthesis. Such a degassing ($1_5$) makes it possible to increase the yield of hydrochloric acid gas by at least 3%.

Preferably, step (2) comprises at least one wet hydrolysis ($2_1$) which takes place, with stirring, at a temperature of between 10° and 50° C. and in which the siloxane fluid $F_1$ obtained after step (1) is reacted with an aqueous solution $S_2$ of hydrogen halide. The concentration of this solute in $S_2$ corresponds to a fraction of the reference saturation concentration (Csr), of the same solute in an aqueous solution, and under the same temperature and pressure conditions, this fraction representing 45 to 75%, preferably 50 to 72%, of Csr. The mass ratio of phase to supply $MR_2$=aqueous phase/fluid $F_1$ is adjusted to a value greater than or equal to 1.5, preferably between 2 and 10, so as to allow the hydrolysis of the ≡SiX bonds of the siloxane fluid $F_1$, to a level of at least 95%, preferably of at least 98%, and thereby to obtain a siloxane fluid $F_2$ consisting essentially of linear α,ω-dihydroxylated or α,ω-dihalo oligomers and, optionally, to a lesser extent, of cyclic oligomers.

In the context of this step (2) of wet hydrolysis, a higher hydrolysing force than that of step (1) is used, such an increase being achieved by increasing the relative part of the water in the hydrolysis medium and thus by decreasing the aqueous HCl titre. In accordance with the invention, this wet hydrolysis 2 is intended to further the progress of the hydrolysis of the SiX bonds to a value sufficiently close to 100%, that is to say, for example, ≧95%, preferably ≧98%.

The adjustment of the hydrolysing force of the hydrolysis medium of step (2) may be perceived, in particular:

through the HCl titre, which is thus advantageously a fraction of from 45 to 75% of the Csr, and through the temperature.

One of the original characteristics of the process according to the invention is, for given experimental conditions, to act on the HCl titre in order to adjust the reaction progress.

In any case, this titre is particularly critical since the chlorosiloxanes hydrolysed in step (2) comprise approximately as many ≡SiX bonds as ≡SiOH bonds. This means that the risks of polycondensation are great and it is known that the main consequence of such a reaction is a prohibitive increase in the viscosity of the polyorganosiloxanes and thus of the entire reaction medium.

Another important parameter is the duration of the reaction between $F_1$ and the aqueous phase $S_2$, in step $(2_1)$. Advantageously, this duration is between 4 and 20 min, preferably between 7 and 12 min.

For step $(2_1)$, it is preferable to maintain a homogeneous liquid/liquid mixture, by means of vigorous stirring in the reaction medium (e.g. stirred reactor or closed loop).

In practice, the siloxane fluid $F_2$—also known as "acidic silox"—contains, for example, about 0.6 to 3% by weight of residual halogen of HX and ≡SiX types.

By way of example, the concentration of hydrogen halide in $S_2$ is about 30% under the experimental conditions given below: the temperature is equal to about 25° C. and the reaction time of $(2_1)$ is between 7 and 12 min.

According to a particular arrangement of the invention, step (2) also includes at least one separation operation $(2_2)$, preferably by settling, of the siloxane fluid $F_2$ obtained from $(2_1)$ and of the concentrated aqueous solution $S_2$, the latter advantageously being at least partly recycled into the wet hydrolysis $(2_1)$ of step (2) and/or into the hydrolysis under pressure $(1_1)$ of step (1), as a supply of hydrolysis water.

The separation $(2_2)$ is, for example, an operation of settling by gravity.

The possibilities of recycling the remainder of $S_2$ into step $(1_1)$ and/or step $(2_1)$ contribute towards the economy of the process according to the invention.

The siloxane fluid $F_2$ obtained from step (2) still contains a few ≡SiX bonds to be hydrolysed as well as droplets of halogen-containing (hydrochloric) solution $S_2$. Thus, in order to perfect the hydrolysis and the purification, step (3) is then carried out, which comprises at least one treatment $(3_1)$ of thorough hydrolysis of the siloxane fluid $F_2$ obtained in (2), using an aqueous phase as a dilute aqueous solution $S_3$, the water content of which is greater than or equal to 90% by weight, preferably between 92 and 97%, the amounts of $F_2$ and $S_3$ used in $(3_1)$ being adjusted such that the mass ratio of phase to supply $MR_3$=aqueous phase/fluid $F_2$ (acidic silox) is greater than or equal to 1.5 and preferably between 2 and 10.

When the water content is less than 100%, the difference to 100 of $S_3$ is then a solute. The said solute, which is present in a proportion of not more than 10% by weight of the aqueous phase, and preferably in a proportion of from 3 to 8%, mainly comprises at least one salt and optionally a minor amount of at least one acidic or basic agent.

The said treatment $(3_1)$ thus makes it possible to complete the hydrolysis of the residual=SiX bonds in $F_2$, which is then converted into siloxane fluid $F_3$, consisting essentially of linear α,ω-dihydroxylated oligomers and, to a lesser extent, of cyclic oligomers.

Advantageously, the reaction time of the thorough hydrolysis $(3_1)$ is longer than or equal to 5 min, preferably to 10 min. However, it goes without saying that, in any case, the term of this reaction $(3_1)$ will depend on the moment at which all of the ≡SiX groups have been hydrolysed. It is the responsibility of the person skilled in the art to evaluate and determine this moment, in order to minimize the duration of the industrial process.

According to a very much preferred arrangement of the invention, the aqueous phase $S_3$ comprises a solute which is present in a proportion of from 3 to 8% by weight of the aqueous phase, and mainly comprises at least one salt and a minor amount of HCl.

In accordance with a particular feature of the invention, the salt or salts used in the context of step $(3_1)$ is (are) chosen from the following group: NaCl, LiCl, NaHCO$_3$, Na$_2$CO$_3$.

This (or these) optional salt(s) may be incorporated directly into the aqueous phase $S_3$ and/or may be generated in situ by neutralization of all or part of the hydrogen halide present, using at least one basic agent which is preferably chosen from the following bases: NaOH, KOH, LiOH, NaOH being particularly preferred.

The presence of a salt in the aqueous phase, whether or not it is obtained by neutralization of the HCl using a base, makes it possible to optimize the separation step $(3_2)$ (settling).

According to an advantageous mode of the invention, step $(3_1)$ takes place at a temperature above or equal to 60° C., preferably between 70° and 100° C. and even more preferably between 80° and 90° C.

Advantageously, $F_3$ has a residual halogen content of HX and ≡SiX types of less than or equal to 60 ppm, preferably less than or equal to 30 ppm; it should be noted that the residual halogen content of ≡SiX type is generally less than 1 ppm. The reaction is complete.

In practice, it is advantageous to allow for homogenization of the reaction medium during step $(3_1)$ (e.g. stirred reactor or closed loop).

In addition step (3) includes at least one separation operation $(3_2)$, preferably by settling, of the siloxane fluid $F_3$ obtained from $(3_1)$, from the aqueous phase, the latter, once recovered, being at least partly recycled at least into step $(3_1)$ and optionally into step(s) $(1_1)$ and/or $(2_1)$ provided that this aqueous phase contains no salt. This settling allows a siloxane fluid or an oil $F_3$ to be collected, in which all or substantially all of the ≡SiX bonds are hydrolysed.

The siloxane fluid $F_3$ recovered at the end of the separation step $(3_2)$ is, admittedly, totally hydrolysed, but still contains droplets of aqueous phase.

Thus, according to an optional, but nevertheless advantageous, mode of the invention, $F_3$ is subjected to a coalescence step (4) which consists essentially in passing the fluid $F_3$ through a porous material so as to extract the droplets of acidic aqueous phase contained in $F_3$ and to obtain a siloxane fluid $F_4$ consisting essentially of linear α,ω-dihydroxylated oligomers having a residual halogen content of less than or equal to 10 ppm, generally to 2 ppm, and, to a lesser extent, of cyclic oligomers (30%).

Advantageously, the porous material used in step (4) is selected from the following group of materials:

precipitation silicas, woven or nonwoven fibrous supports based, for example, on glass fibres and/or on polymer fibres (cellulose, polyester, polypropylene), glass fibres, zeolites, and mixtures thereof.

According to an original and advantageous characteristic of the invention, the siloxane fluids $F_3$ and the siloxane fluid $F_4$ free of ≡SiX bonds and virtually free of droplets of aqueous phase, have a viscosity at 25° C. of less than or equal to 50 mPa.s, preferably 40 mPa.s and even more preferably of between 25 mPa.s and 35 mPa.s.

Such a low viscosity is particularly welcome insofar as it significantly facilitates the handling and processing of the masses treated in the process. Furthermore, this makes it feasible and entirely possible to envisage the succession of typical steps of the process according to th e invention in order to obtain at the end a polyorganosiloxane of high quality and high purity, as indicated above.

More precisely, the percolation treatment of $F_3$ through a porous support allowing the coalescence of the residual droplets of aqueous phase is preferably carried out at a flux (flow rate/unit of surface area) of from 1 to 10 cm/min and at a temperature of about 50° C., for example.

Advantageously, the final content of linear α,ω-dihalo oligomers Of $F_4$ is between 50 and 70% by weight, the difference consisting of cyclic oligoorganosiloxanes.

Insofar as it has been seen above that the preferred halogen X, in the context of the invention, is chlorine, it may be specified, in a non-limiting manner, that $Me_2SiCl_2$, $MeSiCl_3$ or $Me_3SiCl$ will be preferred as starting organohalosilane.

Irrespective of the embodiment of the continuous or batchwise process according to the invention, a person skilled in the art will be entirely capable of selecting the necessary equipment (closed or open reactors, settling tanks, pressure-release systems, coalesces, etc.) in order to produce a device for carrying out the process considered.

The invention will be better understood with the aid of the examples which follow, of the preparation of polydimethylsiloxane oil $F_4$ by hydrolysis of dimethyldichlorosilane ($Me_2SiCl_2$). These examples clearly bring forth all the advantages and implementation variants which may be envisaged for the process according to the invention.

The single figure appended shows the flow diagram of the process taken by way of non-limiting example in order to illustrate the invention. This is a process operating continuously, in which a flow 1 of $Me_2SiCl_2$ is subjected to hydrolysis step ($1_1$) under pressure. Flows 14 and 5 of hydrochloric solution $S_1$ which are respectively formed by the recycled HCl solutions $S_3$ and $S_2$ from steps 3 and 2 do, themselves also, participate directly in the hydrolysis ($1_1$).

This hydrolysis produces a crude hydrolysate comprising a siloxane fluid $F_1$, HCl gas and an aqueous phase formed of a solution saturated with HCl $S_1$. This hydrolysate is represented by flow 2, which is subjected to step ($1_2$) of gas/liquid separation, leading to a gas flow 3 which is subjected to a purification ($1_4$) by condensation at −5° C., the said purification ($1_4$) making it possible to obtain HCl gas under high pressure in a flow 6. The separation ($1_2$) also generates a flow 4 formed of a liquid/liquid mixture which is subjected to a separation ($1_3$), at the end of which are produced, on the one hand, a flow 5 of solution $S_1$ recycled into ($1_1$), and a flow 7 formed of a siloxane fluid (chlorosilox $F_1$).

Chlorosilox $F_1$ is subjected to a degassing ($1_5$) by decompression, which generates a gas flow 8 of low-pressure HCl and a liquid flow 9 formed of degassed $F_1$.

The latter is subjected to a wet hydrolysis ($2_1$), which requires a water supply flow 10 and a supply flow 17 of aqueous recycled HCl solution $S_2$. The wet hydrolysis ($2_1$) leads to a flow 11 consisting of a liquid mixture of siloxane fluid $F_2$ and of HCl solution $S_2$. This flow 11 is subjected to a liquid/liquid separation ($2_2$) by settling. This generates, on the one hand, a fluid 13 of aqueous HCl solution $S_2$, composed of flow 17 for recycling into step ($2_1$) and of a flow 14 of $S_2$ for recycling into step ($1_1$). The excess $S_2$ recycled by the flow 14 is removed via a flow 15. The separation ($2_2$) also leads to a flow 12 corresponding to the siloxane fluid $F_2$, which is subjected to a thorough hydrolysis ($3_1$), requiring supplying with a sodium hydroxide flow 16 and with a flow of settled aqueous solution 22. The flow 18 obtained from step ($3_1$) is a liquid mixture of polyorganosiloxane and of hydrochloric solution $S_3$. After separation ($3_2$), the flow 18 leads to a flow 20 of hydrochloric solution $S_3$ and to a flow 19 of siloxane fluid $F_3$.

The latter is lastly subjected to the coalescence treatment (4), which generates a flow 21 consisting of the siloxane fluid $F_4$ or polydimethylsiloxane oil freed of virtually all of the aqueous HCl droplets.

EXAMPLE

Step 1:

The following are supplied to a reactor/degasser/decanter assembly operating at the service pressure b=0.3 MPa absolute and at a temperature T=30° C.:

$Me_2SiCl_2$ of 1.98 kg/h,

HCl solution titrating at 26%, of 0.34 kg/h, aqueous HCl solution titrating at 44%, at a rate of 23.6 kg/h, such that the mass ratio for supply of the aqueous and siloxane phases $MR_1$ is 12.

The chlorosilox or siloxane fluid $F_1$ obtained after step ($1_5$) is produced at a rate of 1.2 kg/h.

The weight composition of $F_1$ is as follows:

9.7% of residual chlorine (of HCl and ≡SiCl types),

33% of cyclic oligoorganosiloxanes, 6 7% of linear α,ω-chloro oligoorganosiloxanes.

The chlorosilox $F_1$ has a viscosity of 4.7 mPa.s.

Step 2:

The siloxane fluid $F_1$ is introduced into another reactor/decanter assembly at a rate of 1.2 kg/h. This reactor/decanter assembly is simultaneously supplied with water at a rate of 0.31 kg/h and with aqueous 28.7% HCl solution at a rate of 5 kg/h, such that $MR_2$=4.4.

The pressure prevailing inside the reactor of step (2) is 0.1 MPa and the temperature is about 30° C.

The siloxane fluid $F_2$ obtained after step ($2_2$) (also known as acidic silox) is produced at a flow rate of 1.17 kg/h. This acidic silox $F_2$ comprises 1.3% by weight of residual chlorine (of HCl and≡SiCl types).

The viscosity of the acidic silox $F_2$ is 28 mPa.s at 25° C.

$F_2$ comprises 37% by weight of cyclic polydimethylsiloxane and 63% by weight of α,ω-dichloro and α,ω-dihydroxylated polydimethylsiloxane.

Step 3:

The acidic silox $F_2$ is supplied to a reactor/decanter assembly at a rate of 1.17kg/h, with an aqueous sodium hydroxide solution having a titre of 3% by weight of NaOH and at a supply flow rate of 0.46 kg/h, and with 4.5 kg/h of recycled aqueous phase obtained from the separation step ($3_2$).

The $MR_3$=4.2.

The NaCl (neutralization salt) concentration in the aqueous phase is 4.2% by weight.

The pressure prevailing in the reactor/decanter assembly is 0.1 MPa and the temperature is 85° C.

The siloxane fluid $F_3$ obtained after step ($3_2$) is supplied at a rate of 1.14 kg/h.

This siloxane fluid $F_3$, also known as neutral silox, comprises 50 ppm of residual chlorine (of HCl and ≡SiCl types; the chlorine content of ≡SiCl type alone being less than 1 ppm), 37% by weight of cyclic polydimethylsiloxane and 63% by weight of linear, essentially α,ω-dihydroxylated, polydimethylsiloxane.

The viscosity of $F_3$ is 37 mPa.s at 25° C.

Step 4:

The neutral siloxane $F_3$ is percolated onto a porous support consisting of precipitated silica having average pore diameters equal to 350 µm. The supply flow rate of $F_3$ is 1.14 kg/h. The rate of migration through the porous support is 1.5 cm/min. The pressure is 0./1 MPa and the temperature is 20° C.

The polydimethylsiloxane $F_4$ obtained is produced at a rate of 1.14 kg/h. It comprises 1 ppm of total residual chlorine and consists of 63% by weight of linear α,ω-dihydroxylated polydimethylsiloxane and 37% by weight of cyclic polydimethylsiloxane.

The viscosity of $F_4$ is 37 mPa.s at 25° C.

What is claimed is:

1. A Process for the preparation of polyorganosiloxanes by hydrolysis of one or more organohalosilane of formula (I) $R_aR^1_bSiX_c$, wherein:

R or $R^1$, identical or different, is an hydrogen atom, a linear $C_1$–$C_6$ alkyl, a branched aryl, an alkylaryl or an aralkyl group;

X is a halogen atom; and the sum a+b+c=4, with 0<c<4; the said process comprising the following steps:

carrying out three or more successive hydrolysis steps (1), (2), (3), of the organosilane (I) to obtain a reaction medium capable of exerting an increasing hydrolysing force on the organohalosilane (I), the said step (1) being a hydrolysis under pressure in the presence of an aqueous solution $S_1$ of saturated hydrogen halide, at the pressure and temperature of the reaction medium; and optionally, carrying out one or more coalescence step (4).

2. A Process according to claim 1, wherein said process is, carried out continuously.

3. A Process according to claim 2, wherein the step (1) of hydrolysis under pressure comprises:

one or more hydrolysis step ($1_1$) of the organohalosilane (I) to obtain one or more three-phase crude hydrolysate comprising a gas phase formed of a hydrogen halide gas under pressure; a siloxane fluid $F_1$ consisting essentially of linear $\alpha,\omega$-dihalo oligomers, and, optionally, cyclic oligomers; and an aqueous phase containing the solution $S_1$ saturated with hydrogen halide;

one or more gas/liquid separation step ($1_2$) in order to collect the hydrogen halide gas under pressure, on the one hand, and an $F_1/S_1$ mixture, on the other hand;

one or more liquid/liquid separation step ($1_3$) to recover $F_1$ and $S_1$, $S_1$ being optionally recycled into step ($1_1$);

optionally one or more purification step ($1_4$) of the gas collected in step ($1_2$); and optionally one or more additional degassing step ($1_5$) of the fluid $F_1$ collected in step ($1_3$).

4. A Process according to claim 3, wherein the hydrolysis step ($1_1$) is carried out,on one hand, with stirring in one or more closed chamber, at a temperature of between 10° and 50° C., and at a controlled pressure of hydrogen halide gas, greater than or equal to 0.10 Mpa; and, on the other hand, with adjusting input flow rates of the gas phase and of the aqueous phase in order to obtain a mass ratio aqueous phase/organohalosilane(I) phase greater than or equal to 2.

5. A Process according to claim 4, wherein the said mass ratio is between 3 and 15.

6. A Process according to claim 4, wherein the hydrolysis step ($1_1$) has a duration of between 30 s and 5 min.

7. A Process according to claim 6, wherein said duration is between 1 and 2 min.

8. A Process according to claim 3, wherein step (2) further comprises one or more wet hydrolysis ($2_1$) which takes place, with stirring, at a temperature of between 10° and 50° C. and wherein:

the siloxane fluid $F_1$ obtained after step (1) is reacted with a concentrated aqueous solution $S_2$, the solute of which is the hydrogen halide having a concentration in $S_2$ corresponding to a fraction of a reference saturation concentration, of the same solute in an aqueous solution, and under the same temperature and pressure conditions, this fraction representing 45 to 75%, of the reference saturation concentration; and with a mass ratio of a phase to supply, aqueous phase/fluid $F_1$, being adjusted to a value greater than or equal to 1.5 so as to allow the hydrolysis of the $\equiv$SiX bonds of the siloxane fluid $F_1$, to a level of at least 95% and thereby to obtain a siloxane fluid $F_2$ consisting essentially of linear $\alpha,\omega$-dihydroxylated or $\alpha,\omega$-dihalo oligomers and, optionally, of cyclic oligomers.

9. A Process according to claim 8, wherein the wet hydrolysis step ($2_1$) has a duration of between 4 and 20 min.

10. A Process according to claim 8, wherein the said step (2) further includes one or more separation operation step ($2_2$) of the siloxane fluid $F_2$ obtained from step ($2_1$), from the concentrated aqueous solution $S_2$, $S_2$ being at least partly recycled into the hydrolysis under pressure ($1_1$) of step (1) or into the wet hydrolysis ($2_1$) of step (2), as a supply of hydrolysis water.

11. A Process according to claim 8, wherein the said step (3) further comprises one or more treatment ($3_1$) of thorough hydrolysis of the siloxane fluid $F_2$ obtained in said step (2), using an aqueous phase as a dilute aqueous solution $S_3$ with a water content greater than or equal to 90% by weight, with an amount of $F_2$ and $S_3$ used in ($3_1$) being adjusted to obtain a mass ratio of a phase to supply, aqueous phase/fluid $F_2$, greater than or equal to 1.5, the said treatment ($3_1$) completing the hydrolysis of the residual $\equiv$Si—X bonds in $F_2$, which is then converted into siloxane fluid $F_3$, consisting essentially of linear $\alpha,\omega$-dihydroxylated oligomers and of cyclic oligomers.

12. A Process according to claim 11, wherein the aqueous phase $S_3$ comprises a solute present in a proportion of not more than 10% by weight of the aqueous phase, and comprises at least one salt and optionally, at least one acidic or basic agent.

13. A Process according to claim 12, wherein the salt present is incorporated directly into the aqueous phase or is generated in situ by neutralization of all or part of the hydrogen halide present, using one or more basic agent selected from the group consisting of NaOH, KOH and LiOH.

14. A Process according to claim 11, wherein the said step ($3_1$) takes place at a temperature above or equal to 60° C.

15. A Process according to claim 14, wherein said temperature is between 70° and 100° C.

16. A Process according to claim 11, wherein the said step (3) further comprises one or more separation operation ($3_2$)of the siloxane fluid $F_3$ obtained from ($3_1$) from the aqueous phase, all or part of said siloxane fluid $F_3$, once recovered, being recycled into step ($3_1$).

17. A Process according to claim 16, further comprising a step (4) of coalescence of $F_3$ obtained from ($3_2$) which consists essentially in passing $F_3$ through a porous material so as to extract the droplets of acidic aqueous phase contained in $F_3$ and to obtain a siloxane fluid $F_4$ consisting essentially of linear $\alpha,\omega$-dihydroxylated oligomers having a residual halogen content of less than or equal to 10 ppm, and of cyclic oligomers.

18. A Process according to claim 17, wherein the porous material is selected from the group consisting of precipitation silicas, woven or nonwoven fibrous supports, zeolites, and mixtures thereof.

19. A Process according to claim 17, wherein the siloxane fluids $F_3$ and $F_4$ have a viscosity at 25° C. of less than or equal to 50 mPa.s.

20. A Process according to claim 19, wherein the siloxane fluids $F_3$ and $F_4$ have a viscosity at 25° C. of between 25 mPa.s and 35 mPa.s.

21. A Process according to claim 1, wherein the halogen X is Cl.

22. A Process according to claim 19, wherein the starting organohalosilane is $Me_2SiCl_2$, $MeSiCl_3$ or $Me_3SiCl$.

* * * * *